Aug. 28, 1951  R. H. HILL  2,565,919
TRACTOR CAB
Filed Nov. 15, 1946
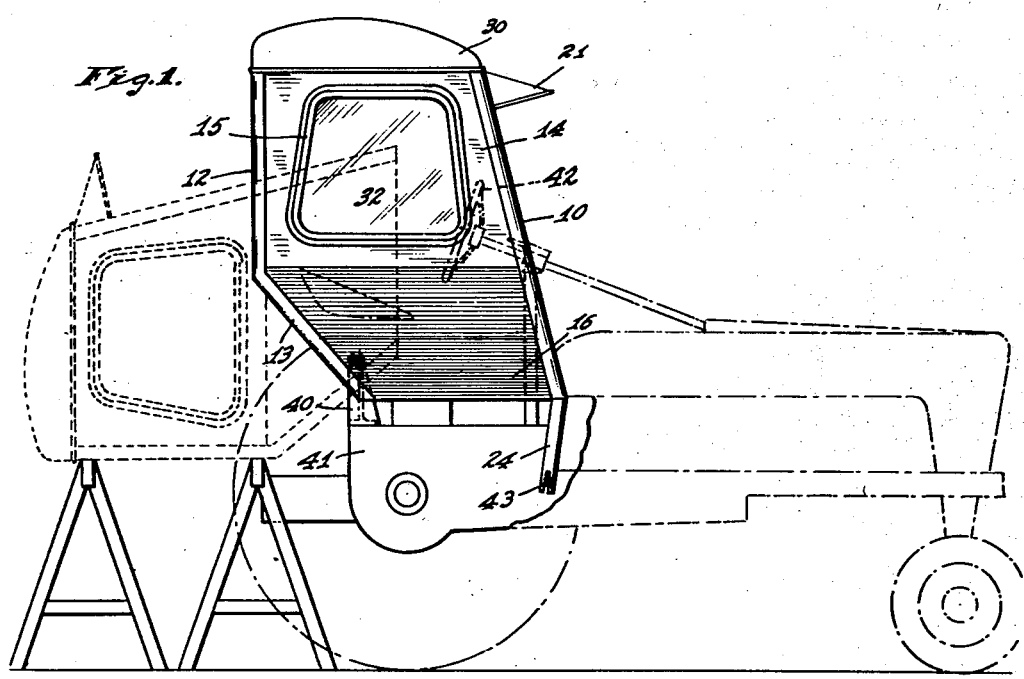
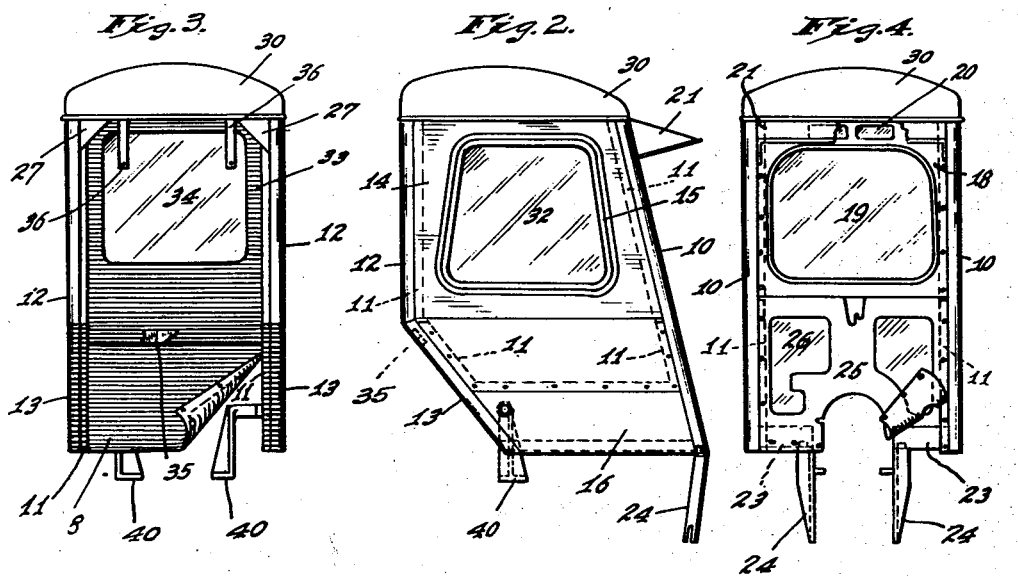
INVENTOR.
ROBERT H. HILL,
BY
*Schley, Trask & Jenkins*
ATTORNEYS.

Patented Aug. 28, 1951

2,565,919

UNITED STATES PATENT OFFICE 2,565,919

TRACTOR CAB

Robert H. Hill, Fort Wayne, Ind., assignor to Tokheim Oil Tank & Pump Company, Fort Wayne, Ind., a corporation of Indiana Application November 15, 1946, Serial No. 710,055

2 Claims. (Cl. 296—28)

This invention relates to a tractor cab, as for a farm tractor.

It is the object of my invention to provide an improved cab for association with a tractor, such as a farm tractor, which will be readily adapted to meet the variable conditions under which useful operation of the tractor occurs; which will provide convenience and comfort in substantially all of such conditions and will be readily changeable to meet such conditions as the variations therein occur. It is my further object to provide a cab which will provide for the convenient operation of the tractor under the different conditions of operation, and for the convenient operation of the several implements and accessories which may be operated by the tractor or associated with it in its operation. It is my further object to provide a cab which can be mounted on the tractor and removed therefrom conveniently by the operator himself, and which will be inexpensive, readily manufactured and distributed, and practical and sturdy in use.

In the attainment of these objects, I make a tractor cab of light weight from sheet-metal stampings of a size to give the operator ample room, and avoid substantial excess size or weight. I make the cab-top of a single sheet-metal stamping and the upper halves of the side and front walls of the cab of sheet metal panels having large window openings, and I close the side-windows, the lower-halves of the side and front-walls, and the full height of the back-wall, with readily removable curtains having transparent windows therein. With the curtains all in place, the cab provides protection and comfort to the operator in cold or stormy weather. By partial removal of the curtains, the cab may be adapted to intermediate weather conditions, and by full removal the cab gives desirable protection from the sun with ample openings for coolness. The curtain for the rear wall of the cab is divided, on a horizontal middle line, either or both parts of which may be used as desired, to give both protection and ample freedom for the manipulation of controls of implements attached to the tractor.

The cab is of a special shape, which contributes functionally to its advantages. Thus, the front wall of the tractor has a considerable backward slope, to place its lower end in position for attachment to the tractor well ahead of the operating mechanism therefor, to give ample leg and foot room for the operator and for his use of foot-operated controls, and yet to reduce the roof and side wall area and hence to reduce weight. The back wall of the cab has a generally vertical upper portion, and a lower portion which slopes abruptly inward to a point on the axle of the housing, to give full and convenient clearance for attachment to the tractor of various implements as desired. Moreover, this configuration of the back wall, and the corresponding configuration of the side walls, puts the lower end of the back wall below, or nearly below, the center of gravity of the cab, which contributes to its ready mounting and demounting from the tractor.

To support the cab on the tractor, I provide pivotal supports on a transverse axis ahead of the rear wall of the cab but slightly behind the center of gravity of the cab, and supplemental brackets at the forward wall of the cab which, upon release, are desirably separable from the tractor by rearward pivotal movement of the cab about its axis of pivotal support. The pivot axis is positioned above the bottom of the cab, which insures that in pivotal movement of the cab about that axis, the lower edge of the front wall panel will clear the steering wheel and associated control mechanism of the tractor.

By this arrangement, a single operator alone may attach and detach the cab from the tractor. For this, he may release the supplemental front supports of the cab and tilt the cab rearwardly about the pivotal axis of its rear supports on to any convenient stationary support, may then disconnect the rear support, and drive the tractor away, leaving the cab on the stationary support. In this operation, by reason of the location of the cab supports, the operator is required to do a minimum of lifting, for the rearward tilting of the cab carries it through but a short movement before it is in a balanced position over the pivotal support, and he then is required merely to lower the cab rearwardly to the stationary bed.

The replacement of the cab on the tractor is likewise relatively simple, and well within the capacity of an ordinary single operator. It requires merely that the operator back the tractor into position to connect the rear supports. He then tilts the cab forward about the pivot axis of the rear supports until its front supports are engaged, and secures those front supports. While this operation requires more lifting than the removal operation, that lifting may be done from the ground, where the operator has a firm footing, and no lifting is required in either operations from positions on the tractor. It is noted that the front supports for the tractor are mounted on the side wall of the tractor, and while they extend inwardly and partially obstruct the otherwise open lower half of the front wall, the operator may readily mount the seat of the tractor in normal position when the cab is in its rearward tilted position, and has ample clearance for himself and for the operating parts of the tractor to drive the tractor away from the disconnected cab or to back the tractor into connecting position with respect to that cab.

The accompanying drawing illustrates my invention. In such drawing, Fig. 1 is a side elevation of a cab embodying my invention, shown in full lines in place on a tractor, and in dotted lines in its rearward tilted position resting on a stationary support; Fig. 2 is a similar side elevation of the cab in upright position; Fig. 3 is a rear elevation of a cab; and Fig. 4 is a front elevation of the cab.

The side-walls of the tractor may be unitary stampings, but desirably, and as shown in the drawing, each side-wall is formed of a front corner post 10, a rear corner post 12, and panels 14 and 16. The front corner posts 10 are straight throughout their length and are transversely curved with offset flat flanges 11 at each side edge. The rear corner members are of similar cross sectional shape and have a vertical straight portion 12 over approximately the upper half of the cab and an inclined straight portion 13 over approximately the lower half of the cab. Each side pair of corner members 10 and 12 are joined over approximately the upper half of the cab by a sheet metal wall panel 14, which is welded against the flanges 11 of the corner members 10 and 12, and is provided with an unglazed window opening 15. At the lower end of each side pair of corner members, and spaced below the side wall panel 14, a side plate 16 joins the corner members 10 and 13. This plate 16 extends upwardly a substantial distance, both to provide a protecting barrier between the operator and the tractor wheel, and to form a substantial support for the pivoted rear bracket for the cab. The front pair of corner members 10 are joined by a front wall panel 18 containing a glass windowshield 19. The panel 18 may desirably also contain ventilating openings 20 adjacent its upper edge, and these are desirably covered by a visor 21 attached to the front panel 18. The front panel 18 overlaps the flanges 11 of the front corner posts 10 and is secured thereto. Conveniently, the attachment of the front panel is by bolts, for reasons which will be pointed out below, but it may be by welding if desired. At the lower ends of the front corner members 10 there are inwardly extending support members 23, the inner ends of which are connected to downwardly extending brackets 24 for attachment to the tractor. The inwardly extending front support members may be connected to the upper panel 18 either by side panels or by braces, if desired, but such braces are not necessary and conveniently the space above the members 23 is left open, and closed with a detachable curtain 25.

The rear of the cab is substantially fully open, but desirably the connection between the rear corner post 12 and the top are braced by corner braces 27.

The top 30 of the cab is a single sheet-metal stamping, provided with suitable flanges or ears by which it may be secured to the corner members 10 and 12 and to the side and front panels 14 and 18. While the top 16 may be secured to the sides and front by welding, I prefer to secure the top to the cab, and to secure the front panel 18 to the front corner members 10, by bolts. By this means, the cab may be shipped in the usual channels of distribution in a disassembled condition, with the two unitary side walls including the corner members, the front panel 18, the top 30, and the side curtains packed in nested relation together in a much smaller space than that required for the assembled cab. The cab may then readily be assembled either by the final seller or by the purchaser.

For substantially completely enclosing the cab, I provide curtains to cover the openings in the sheet-metal structure. The side window openings 15 are desirably closed by curtains having a flexible window 32, and may be attached by detachable fastenings around the edges of the window opening 15. The lower opening in each side wall, between the panel 14 and the plate 16 is closed by separate detachable curtains, which may be fully opaque. These are desirably secured at the top to the inside of the wall panel 14, along their edges to the outer sides of the inwardly extending flanges 11 of the corner members 10 and 13, and at the bottom to the outer side of the plate 16. The lower half of the front wall is closed by a curtain 25, detachably secured at the top to the inside of the lower edge of the front panel 18, and at the sides to the outside of the inwardly extending flanges 11 of the corner members 10. The front curtain 25 desirably contains flexible windows 26 and is cut to fit around the adjacent parts of the particular tractor upon which the cab is to be mounted.

The rear wall of the tractor is closed by two curtains meeting on a horizontal line slightly below the bend in the rear corner members 12—13. The upper curtain 33 may be secured at the top in a manner which does not provide ready detachability, and desirably lies inside the corner braces 27 and inside the inwardly extending flanges 11 of the corner members 12. It includes a large flexible window 34, and at its lower edge has a wide hem in which a cross member 35 is received. The rear curtain 33 may be rolled upwardly, about the cross member 35, and secured by suitable straps 36 secured to the top 30. The cross rod 35 carries at its inside detachable fasteners for the lower curtain 38. The upper curtain is desirably somewhat longer than the vertical portions 12 of the rear corner members, so that when it is fully lowered the cross member 35 lies against the inside of the inwardly extending flanges 11 on the inclined lower portions 13 of the rear corner posts. The lower curtain 38 is desirably secured at its top to the inside of the cross member 35, and at its edges to the flanges 11 of the corner portions 13.

The cab is mounted on the frame of the tractor, conveniently at four points respectively adjacent the four corners of the cab. At the rear, the mounting is by means of a pair of brackets 40 which may be bolted to the frame 41 of the tractor, and which are pivotally interconnected to a side wall of the cab, conveniently through the lower panel 16 of such wall. The pivotal mountings may be separable ones, as by including removable pivot pins, and conveniently may be separable in planes spaced inwardly from the side walls a sufficient distance to clear the inwardly extending flanges 11 of the rear corner members 13.

The front corner supports, as has been described, comprise a pair of inwardly extending supporting members 23 adjacent the lower corners of the front wall of the tractor, and a pair of depending brackets 24. Such brackets 24 are desirably slotted at their lower ends in a way which permits them to engage and disengage studs 43 on the tractor as the cab is pivoted about its pivotal axis.

In my new cab structure, the upper portion of the cab is positioned to enclose the operator's position on the tractor and to give such operator ample freedom of movement and of vision, to operate the tractor and to watch the ground over which the tractor is moving and the implements which may be operated by or with the tractor. The lower portion of the cab, because of the inclined front wall of the cab, gives the operator ample room to operate the pedals of the tractor; and because of the inclined position of the corner members 13 of the cab and of the lower rear curtain stretched between such corner members 13, the cab fully avoids interference with implements which are attached to the rear of the tractor and with the means by which such implements are attached and operated.

The two brackets 40 provide a pivotal mounting on transverse horizontal pivot axes, the position of which is related both to the cab structure and to the tractor structure. Such pivotal axis is positioned with respect to the cab structure so that as the cab is pivoted about that axis the lower edge of the front panel 18 will move in a path which clears the steering wheel 42 of the tractor and associated control mechanism for the tractor. The pivotal axis is related to the position of the lower rear corner members 13 of the cab, so that in pivotal movement of the cab about such axis, such corner members 13 will clear the tractor structure. In addition, such pivotal axis is at a point which avoids interference and which places the cab at a point which avoids interference with the portions of the tractor usually mounted adjacent the rear of the axle housing thereof, by which implements and attachments are secured for operation with and by the tractor. Moreover, the pivotal axis is a considerable distance ahead of the rear vertical corner members 12 of the cab, so that it lies directly below a point adjacent the mid point of the top of each side wall of the cab, and hence relatively close to the transverse vertical plane containing the center of gravity of the cab.

The relative position of center of gravity close to the pivot axis results also from interrelation of the cab structure. Thus in general the upper approximate half of the cab is of sheet-metal panel construction, while the lower half is generally of open frame construction. Such upper half construction gives the necessary rigidity and strength to the cab, and the special configuration of the cab centers the weight of the panel construction rearwardly toward the pivot axis.

The position of the pivotal mounting adjacent the vertical transverse plane containing the center of gravity of the cab assists in the attachment and detachment operations, by minimizing the amount of lifting which is necessary in tilting the cab from one position to the other and providing that all necessary lifting may be done from the ground and need not be done from any position on the tractor.

The configuration and structure of the cab and the position of its mounting are thus interrelated in a way which facilitates the ready attachment and detachment of the cab by a single operator. In detaching the cab, the operator may release the studs 43 of the front supports, and may then tilt the tractor rearwardly about its pivotal axis onto any convenient stationary support, such as the horses shown by way of example in Fig. 1. Such operation may be performed with the operator standing on the ground. He may then detach the pivotal support, and drive the tractor away from the cab. To re-attach the cab the operator may back the tractor into position with respect to the cab, may attach the pivot mountings; and may then tilt the cab forwardly to its normal position and secure it in place. Again the whole tilting operation may be performed with the operator standing on the ground.

I claim as my invention:

1. A tractor cab, comprising generally parallel side walls, a front wall, and a top, the rear wall thereof being substantially open, each of said side walls having a rearwardly inclined front edge, a generally upright rear edge over its upper portion, and an inclined rear edge over its lower portion, whereby the lower rear corner of said side wall lies below a point adjacent the middle point of the top of said wall, each such side wall comprising front and rear corner members, a rigid wall panel interconnecting the generally upright portion of its rear corner member with the front corner member over the upper approximate half of said side wall, and a rigid lower panel spaced from said upper panel, a pivotal mounting for said cab on a transverse axis cutting said side walls adjacent points above the lower rear corners thereof, said lower side-wall panels providing support for said mounting, said front wall comprising a rigid panel containing a windshield and interconnecting the front corners of said side-walls over the upper approximate half thereof, the lower approximate half of said front wall being open, a demountable curtain for the open lower half of the front wall, demountable curtains for the spaces between the side-wall panels, a rear demountable curtain to close the space between the generally upright portions of said rear corner member, and a separate demountable curtain securable to the bottom edge of said last-named curtain and to the lower inclined portions of said rear corners.

2. A cab for mounting between the spaced rear wheels of a tractor, comprising generally parallel side walls, a front wall, and a top, the rear wall thereof being substantially open, each of said side walls having a rearwardly inclined front edge, a generally upright rear edge over its upper portion, and an inclined rear edge over its lower portion, whereby the lower rear corner of said side wall lies below a point adjacent the middle point of the top of said wall, each such side wall comprising front and rear corner members, a rigid wall panel interconnecting the generally upright portion of its rear corner member with the front corner member over the upper approximate half of said side wall and a rigid lower panel spaced from said upper panel, the transverse dimension of said cab being less than the spacing between the wheels of the tractor, a pivotal mounting for said cab on a transverse axis cutting said side walls adjacent points above the lower rear corners thereof, said lower side-wall panels providing support for said mounting, said front wall comprising a rigid panel containing a windshield and interconnecting the front corners of said side-walls over the upper approximate half thereof, the lower approximate half of said front wall being open.

ROBERT H. HILL.

REFERENCES CITED

The following references are of record in the file of this patent:

UNITED STATES PATENTS

| Number | Name | Date |
|---|---|---|
| D. 142,761 | Zeiler | Oct. 30, 1945 |
| 693,591 | Draper | Feb. 18, 1902 |
| 1,314,225 | Souchek | Aug. 26, 1919 |
| 1,398,307 | Thompson | Nov. 29, 1921 |
| 1,650,757 | Kraus | Nov. 29, 1927 |
| 1,689,765 | Baxter | Oct. 30, 1928 |
| 2,267,227 | Williams | Dec. 23, 1941 |